United States Patent

Papa et al.

[15] 3,673,130
[45] June 27, 1972

[54] NON-PUNKING PHENOLIC FOAM

[72] Inventors: Anthony Joseph Papa, St. Albans; William Robert Proops, Charleston, both of W. Va.

[73] Assignee: Union Carbide Corporation, New York, N.Y.

[22] Filed: April 4, 1969

[21] Appl. No.: 813,768

[52] U.S. Cl. .................260/2.5 F, 260/2.5 FP, 260/2.5 S, 260/826, 260/45.7 P, 260/DIG. 24
[51] Int. Cl. .........................C08g 53/10, C08g 51/62
[58] Field of Search ..............260/2.5 F, 2.5 FP, DIG. 24

[56] References Cited

UNITED STATES PATENTS

| | | | |
|---|---|---|---|
| 2,956,037 | 10/1960 | Venable | 260/2.5 FP |
| 3,178,490 | 4/1965 | Petrino et al. | 260/2.5 FP |
| 2,596,936 | 5/1952 | Nielsen et al. | 260/2.5 FP |
| 2,676,162 | 4/1954 | Marotta | 260/2.5 F |
| 2,892,803 | 6/1959 | Reeves et al. | 260/2.5 FP |
| 3,271,331 | 9/1966 | Ender | 260/2.5 F |
| 3,322,716 | 5/1967 | Klein et al. | 260/2.5 FP |
| 3,389,094 | 6/1968 | D'Alessandro | 260/2.5 F |
| 3,391,226 | 7/1968 | Birum et al. | 260/2.5 FP |

FOREIGN PATENTS OR APPLICATIONS

| | | | |
|---|---|---|---|
| 994,447 | 6/1965 | Great Britain | 260/2.5 F |

*Primary Examiner*—John C. Bleutge
*Attorney*—Paul A. Rose, Louis C. Smith and Francis M. Fazio

[57] ABSTRACT

Non-punking phenolic foams are obtained by inclusion of certain phosphorus-containing compounds in the reaction mixture. The phosphorus compounds include tris(2-chloroethyl)-phosphate, bis(hydroxymethyl)phosphinic acid, tetrakis(hydroxymethyl)phosphonium chloride, the hydroxyalkyl polyphosphates obtained from the reaction of an alkylene oxide with a polyphosphoric acid, and the adduct of ammonia with phosphorus pentoxide.

5 Claims, No Drawings

NON-PUNKING PHENOLIC FOAM

This invention relates to an improved process for the production of phenolic foams. More particularly it is concerned with the production of non-punking phenolic foams by inclusion of certain phosphorus-containing compounds in the reaction mixture.

The production of non-punking foams has previously been disclosed in U.S. Letters Pat. No. 3,298,973. In that patent phenol-aldehyde resole resins having a viscosity of from about 200 to about 300,000 centipoises at 25° C. are reacted with a catalyst that is a mixture of at least two acidic agents. The catalyst is a solid mixture of boric acid, or its anhydride, and an organic hydroxyl acid in which the hydroxy group is on a carbon atom not more than one carbon atom removed from a carboxyl group. While a commercially acceptable foam is produced, the process suffers from the disadvantage that the catalyst is a solid that must be quickly and uniformly dispersed in the viscous resole resin in order for one to obtain a satisfactory product. This can be difficult because of the viscosity of the resole resin and consequently the process is generally carried out by a slow, tedious batch procedure.

It is also well known that other acidic catalysts such as mineral acids or strong organic acids, e.g., hydrochloric acid, fluoboric acid, toluene sulfonic acid, formic acid, xylene sulfonic acid, phenol sulfonic acid and the like, can be used in the foaming and curing of the phenol-aldehyde resole resins. Generally, however, these acidic catalysts do not produce a non-punking foam. Punking, as is known, is the phenomenon of continuing to glow and combust without a visible flame, even after the combustion source has been removed.

It has now been found that certain phosphorus-containing compounds can be incorporated into the resole resin foaming mixture before the addition of the catalyst for foaming and curing to produce non-punking phenolic foams. Non-punking foams can now be produced even when an acidic catalyst is used, a result that has not heretofore been attainable.

The phosphorus-containing compounds that produce non-punking phenolic foams are very limited; not all phosphorus containing compounds are effective. The suitable compounds and the respective concentration ranges are as follows:

i. tris(2-chloroethyl)phosphate; 5–15 phr
ii. bis(hydroxymethyl)phosphinic acid; 5–15 phr
iii. tetrakis(hydroxymethyl)phosphonium chloride; 5–15 phr
iv. the adducts of ammonia and phosphorus pentoxide; 5–15 phr
v. the hydroxyalkyl polyphosphates of the general formula:

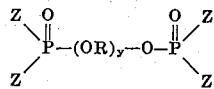

wherein —OR— is the divalent residue of a vicinal epoxide, wherein R has from one to 10 carbon atoms, y is a number that has an average value of at least 1, and Z is an HO(RO)$_y$— group or a

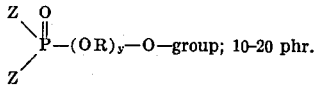

—(OR)$_y$—O—group; 10–20 phr.

All of the compounds of Groups (i) to (v) are known commercially and require no further explanation. They can be used individually or in combination. However, to further facilitate an understanding of the compounds of Group (v), reference is made to U.S. Pat. No. 3,099,676, which is hereby incorporated by reference to show the compounds meant and to define the reactants employed in the processes for their production.

Compounds of Groups (i) to (iv) effectively produce non-punking phenolic foams at concentrations of from about 5 to about 15 parts per hundred parts of resole resin (phr). However, it was observed that at least about 10 phr of compounds of Group (v) were necessary to achieve non-punking characteristics and that an amount as high as about 20 phr can be used. It is believed, though we do not intend to be bound by this theoretical belief, that this higher concentration of this latter type of compounds is needed because of partial hydrolysis of the compounds to phosphoric acid when in contact with the water generally present in the resole resin. It was found that phosphoric acid per se does not produce a non-punking foam and that when phosphoric acid is used as the catalyst it is necessary to use at least 20 parts of the compounds of Groups (i) to (iv) to obtain a non-punking phenolic foam. Thus, while the amounts shown above are the preferred amounts of the phosphorus compound to be used, higher amounts can also be used and, in fact, are desired when phosphoric acid is present or formed. Any suitable amount capable of imparting non-punking characteristics to the phenolic foam can be used, this amount can be termed an anti-punking amount. Preferred phosphorus-containing compounds are those indicated above, as well as any phosphorus-containing compound having a plurality of hydroxyalkyl, preferably hydroxymethyl, groups in the molecule. The test for determining the non-punking characteristics of phenolic foam is to direct a 1.5 inch flame from a propane torch on a 3 × 4 × 6 inches foam sample for the designated period of time and then removing the flame. In a non-punking foam there is no after-glow or combustion after removal of the flame.

The phenol-aldehyde condensation products employed in this invention are not narrowly critical and are well known in the art for making phenolic foams. They are commonly called one-step resins or "resoles", being the condensation reaction products of a monohydric phenol and an aldehyde. Preferred are the resins of phenol per se and formaldehyde, although other phenols such as meta cresol, meta xylenol and the like can as well be employed, as can mixtures of phenol and ortho cresol. Similarly, the formaldehyde can be replaced by other aldehydes or aldehyde liberating compound such as para-formaldehyde, formalin and the like.

The liquid resole resins are the alkaline-catalyzed condensates which are carried to only a mild state of resinification so that they are normally liquid and generally water-soluble. This is often referred to as the "A" state of resinification, the "C" stage being the fully cured thermoset resin stage.

As the condensation between the phenol and aldehyde progresses from the liquid low molecular weight resins, the molecular weight of the condensation product increases, and the resin exhibits a corresponding increase in viscosity. Since the addition of small amounts of the blowing agent may increase or decrease the viscosity of the liquid resins, the viscosity of the foamable composition is not narrowly critical, but is dependent to a degree on the amount of blowing agent present. Typical foamable resole compositions employable herein would include those which have an initial viscosity at 25° C. ranging from about 200 centipoises to about 300,000 centipoises, with those having a viscosity ranging from about 400 to about 25,000 centipoises being preferred for easiest handling.

Minor amounts of water can be tolerated in these resins although it is preferred that water content be kept to less than 10% by weight of resin.

Advantages are also made of mixtures of several different resole resins in order to control the initial viscosity and reactivity of the foamable compositions. For example, mixtures of high viscosity and a low viscosity resin have been used to control the ultimate density of foam. Similarly, mixtures of liquid and solid resole can be employed to the same effect.

It is contemplated in the invention that any resole resin either initially liquid or made fluid by the addition of any agent or by any technique can be employed in this invention.

The foaming of the compositions can be induced by heat or reduction of pressure alone. However, heat is generally in order to advance in foamed resin to a thermoset state. When the mixture of resole resin and a volatile organic blowing agent is employed, the exothermic curing reaction of the condensation reaction is catalyzed by the use of acid catalysts, the exotherm is of such a magnitude to not only volatilize all of the water of condensation and/or any water initially present but also all of the organic blowing agents even those having boiling points as high as 200° F. or more.

While these organic "foam assists" or foaming agents are not essential or critical in this invention, they are immeasurably beneficial in providing uniform and highly desirable results. The preferred foam assists have atmospheric boiling points from −40° to 200° F., and are normally aliphatic hydrocarbons, oxyhydrocarbons, or halohydrocarbons such as alkyl ethers, ketones, lower alkanes and halogenated alkanes as for example pentane, hexane, diethyl ether, diisopropyl ether, acetone, dichloromethane, dichloroethane and the like. Most of these agents provide an open-celled foam highly desirable for use where its liquid "wicking" properties are desirable as a source of moisture for making floral arrangements and the like.

A closed-cell phenolic foam is provided with polyhalogenated saturated fluorocarbons having more than one halogen atom bonded to aliphatic carbon atoms, in which at least one is fluorine, and which compound is free of aliphatic and aromatic unsaturation and is illustrated by the following species.

| Foaming agent: | Atmospheric pressure boiling point, °F. |
|---|---|
| monochlorodifluoromethane | −41 |
| dichlorodifluoromethane | −21.6 |
| 1,2-dichloro-1,1,2,2-tetrafluoroethane | 38.4 |
| 1,1,1-trichloro-2,2,2-trifluoroethane | 45.8 |
| 1,2-difluoroethane | 50 |
| trichloromonofluoromethane | 74.8 |
| 1,1,2-trichloro-1,2,2-trifluoroethane | 117.6 |
| 1,1,2,2-tetrachloro-2,2-difluoroethane | 196.7 |
| 1,1,1,2-tetrachloro-2,2-difluoroethane | 199 |

However, other blowing agents, be they such fluorocarbons or other agents, having a boiling point from about −40° to +200° F. can be used alone or in combination if desired. A plurality or mixture of any of such blowing agents can be employed, in which each is designed to volatilize at a different temperature so as to give volatilization at its respective different temperature throughout the exothermic curing reaction to provide "froth" foaming techniques, i.e., where one agent having a high volatilization rate at the ambient temperature and pressure first foams the resin composition and another which volatilizes at a higher temperature does additional foaming of the resin once the acid mixture initiates the condensation reaction exotherm.

The amount of the foaming assist is not narrowly critical. When it is employed, amounts of from 2 to 50 parts per 100 parts by weight of resin are most desirable, provided that the foamable composition is relatively viscous, i.e., above about 200 cps. Some of these foaming agents have a rather severe dilution effect on the viscosity of the resole resin and cannot be used in the larger amounts. Methylene chloride for example can be employed in amounts only up to about 6 parts per hundred parts of resin whereas, acetone can be employed in amounts up to about 15 parts and diisopropyl ether in amounts up to 20 parts per hundred parts of resin. Because of the unusual solubility phenomena of fluorocarbons, they can be employed in much greater amounts; even up to 50 parts of such agents per hundred parts of resin can be employed. Upon the addition of a fluorocarbon to the resole resin there is no appreciable decrease in viscosity, in fact, there is often an increase in viscosity which remains high during the initial stages of curing and aids in the closed cell nature of foam and the entrapment of the volatilized fluorocarbon.

However, the density of the foam is directly related to the amounts of the blowing agent employed and the rapidity with which the exotherm is developed by the catalyst. The most useful foams commercially are those having densities from about 0.2 to 20 pounds per cubic foot which can be secured by a fast exotherm on a composition without any blowing agent but which can be more controllably developed when a blowing agent is present.

The blowing agents tend to act as nucleating agents for the foam development to provide for cells sites. Hence, a finer cell foam can be made using a blowing agent and particularly fine celled foam is secured with the fluorocarbons since they are soluble in the resole resin in much larger amounts than other agents and do not decrease the viscosity of the resin.

For most applications, it is preferred that the blowing agent be employed in amounts from about 2 to 20 parts per hundred parts of resin.

It has also been found that further advantages are secured in this system when a surface active agent also is employed as an additional control over the cell size in the foam. While it has been found that the cell size using the fluorocarbons is very fine, additional improvements in uniformity and size are secured by the use of a surface active agent. Particularly useful are the non-ionic types such as the polyethers and polyalcohols, such as condensation products of alkylene oxides (such as ethylene oxide and propylene oxide) with alkyl phenols, fatty acids, alkyl silanes and silicones and like materials, as is exemplified by such products as octadecyl phenolethylene oxide, decyl phenol-ethylene oxide sulfate and the low polymers a nucleation agent, very little or no surface active agent is needed. Best results seem to be secured in using amounts from 0.3 to about 5 percent by weight of the agent based on the weight of resole resin, with preferred results at between about 0.5 to 3 percent by weight. Certain surfactants may cause collapse of the foam if employed in too great a concentration, and optimum concentrations vary with the individual surfactant selected.

It is to be understood that in the foamed resins of this invention, there may also be present other ingredients and agents to impart other desirable properties such as pigments, dyes, fillers, stabilizers, neutralizers, flame-proofers, fiber glass, asbestos, silica, and solid nucleating agents and like additives without departing from this invention. In fact, certain beneficial properties result from many such additives. For example, fluorocarbon blown foams accept and tolerate a high filler loading because of the more efficient blowing agent. Also if desired, thermoplastic resins or modifiers such as polyvinyl alcohol, vinyl halide resins, and other similar thermoplastics can be used to improve toughness and other similar properties.

The techniques used for producing phenolic foams are well known to those skilled in the art, as exemplified by U.S. Pat. No. 3,298,973, which is hereby incorporated by reference as a disclosure of necessary reactants and suitable procedures. In the present invention, however, a distinct advantage is that all of the components, including the phosphorus-containing compounds that impart non-punking characteristics to the foam, can be liquid reactants, thus avoiding the problem of mixing in the solid catalysts referred to therein. However, said solid catalysts can be included, if one desires to do so.

The following examples further serve to illustrate this invention. Parts are by weight unless otherwise indicated.

A series of phenolic foam samples was produced by mixing for about 30 seconds 100 parts of a commercially available phenol-formaldehyde resole resin having a viscosity of 6,600 centipoises at 25° C., 1 part of a surfactant having the empirical formula:

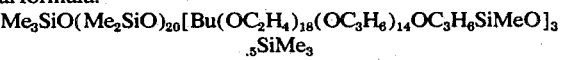

wherein Me is methyl and Bu is butyl and 10 parts of 1,1,2-trichloro-1,2,2-trifluoroethane as blowing agent. Then 15 parts of the specified phosphorus-containing compound and 3 parts of a 48 percent aqueous solution of fluoboric acid were sequentially added, each was stirred for 20 seconds. The mixture was poured into an 8 by 8 by 6 inches metal mold, which had been preheated to 70° C., and it was permitted to foam. The foams were postcured in an air oven at 70° C. for 15 minutes. For comparison purposes a foam was produced without the phosphorus compound but using 13 parts of blowing agent. (Run A). In addition, a foam was produced with a phosphorus-containing compound containing etheric oxygen that is generally used to impart flame retardancy to urethane foams; however, it did not produce a non-punking phenolic foam (Run B). The results are summarized in Table I.

TABLE I

| Example | 1 | 2 | 3 | 4 | Run A | Run B |
|---|---|---|---|---|---|---|
| Phosphorus compound | a | b | c | d | None | e |
| Cream time, sec. | 50 | 50 | – | 90 | 45 | 30 |
| Rise time, sec. | 360 | 420 | – | 470 | 260 | 350 |
| Punking characteristics | | | | | | |
| after 3 min. | No | No | No | No | Yes | Yes |
| after 6 min. | No | No | No | No | | |
| Density, pcf. | 2.36 | 2.77 | 2.16 | 2.72 | – | 1.84 |
| Compressive strength, psi | | | | | | |
| at 25°C. parallel | 23 | 26 | 21 | 25 | – | 14 |
| perpendicular | 15 | 16 | 14 | 20 | – | 8 | a — Tetrakis(hydroxymethyl)phosphonium chloride as an 80 percent aqueous solution.
b — Bis(hydroxymethyl)phosphinic acid
c — Hydroxypropyl polyphosphate of Formula (v) having an average of 4 Z groups wherein y has an average value of about 1.6
d — Tri(2-chloroethyl)phosphate (e) 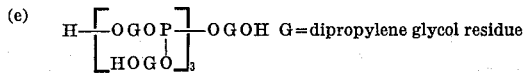 G = dipropylene glycol residue When Example 3 was repeated using only 5 parts of the phosphorus-containing hydroxypropyl polyphosphate compound identified as (c) in Table I, the phenolic foam showed punking characteristics after 3 minutes of exposure to the flame. Thus, as previously indicated, the concentration of compounds of this type must be at least 10 phr to impart non-punking characteristics to the foam.

A series of phenolic foam samples was produced as described in Example 1 using the same reactants and concentrations with the exception that the anti-punking phosphorus-containing compound was present at a concentration of 5 phr. For comparison purposes a foam was produced without the phosphorus compound but using 12 parts of the blowing agent (Run C). In addition a foam was produced corresponding to Run B using 5 phr of the same phosphorus compound used therein; the foam did not have non-punking properties (Run D). The results are summarized in Table II.

TABLE II

| Example | 5 | 6 | 7 | Run C | Run D |
|---|---|---|---|---|---|
| Phosphorus compound | a | b | d | None | e |
| Cream time, sec. | 60 | 70 | 60 | 50 | 40 |
| Rise time, sec. | 280 | >420 | 340 | 290 | 250 |
| Punking characteristics | | | | | |
| after 3 min. | No | No | No | Yes | Yes |
| after 6 min. | No | No | No | | |
| Density, pcf | 1.88 | 2.39 | 2.09 | 1.72 | 1.90 |
| Compressive strength, | | | | | |
| psi at 25°C., parallel | 22 | 22 | 26 | 21 | 24 |
| perpendicular | 15 | 19 | 16 | 13 | 14 |

A series of non-punking phenolic foam samples was produced as described in Example 1 using 100 parts of a commercially available phenol-formaldehyde resole resin having a viscosity of 5,250 centipoises at 25° C., 1 part of the same surfactant and 6 parts of the same blowing agent. The catalyst was the reaction product of a mixture of o- and p-phenolsulfonic acids prepared by reacting equal parts by weight of phenol and concentrated sulfuric acid and diluting with water to 65 percent concentration. Nine and three-tenths parts of the catalyst solution were used. The anti-punking phosphorus-containing compounds employed and the amounts thereof are shown in Table III.

TABLE III

| Example | 8 | 9 | 10 |
|---|---|---|---|
| Phosphorus compound, | a | a | b |
| Parts | 25 | 15 | 15 |
| Cream time, sec. | 37 | 45 | 40 |
| Rise time, sec. | 235 | 215 | 195 |

The phenolic foams of Examples 8 to 10 did not punk after exposure to the flame for 6 minutes.

What is claimed is:

1. In a process for producing a phenolic foam by the reaction of a liquid mixture comprising a phenol-aldehyde resole resin having a viscosity of from about 200 to about 300,000 centipoises at 25° C., a blowing agent and an acidic catalyst, the improvement of adding to said mixture an anti-punking phosphorus compound selected from the group of
  (i) bis(hydroxymethyl)phosphinic acid,
  (ii) tetrakis(hydroxymethyl)phosphonium chloride, and
  (iii) the hydroxyalkyl polyphosphates of the formula:

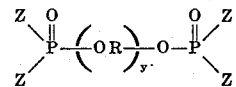

wherein —OR— is the divalent residue of a vicinal epoxide wherein R has from one to 10 carbon atoms, y is a number that has an average value of at least 1 and Z is an $HO(RO)_y$ group or a

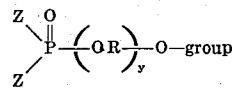

2. A process as claimed in claim 1 wherein the phosphorus compound is bis(hydroxymethyl)phosphinic acid present in a concentration of 5 to 15 parts per hundred parts of resole resin.

3. A process as claimed in claim 1 wherein the phosphorus compound is tetrakis(hydroxymethyl)phosphonium chloride present in a concentration of 5 to 15 parts per hundred parts of resole resin.

4. A process as claimed in claim 1 wherein the phosphorus compound is an hydroxylalkyl polyphosphate of the formula:

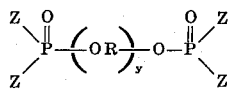

wherein —OR— is the divalent residue of a vicinal epoxide wherein R has from one to 10 carbon atoms, y is a number that has an average value of at least 1 and Z is an $HO(RO)_y$— group or a

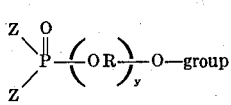

said hydroxyalkyl polyphosphate being present in a concentration of 10 to 20 parts per hundred parts of resole resin.
5. A process as claimed in claim 4 wherein the hydroxyalkyl polyphosphate has the formula
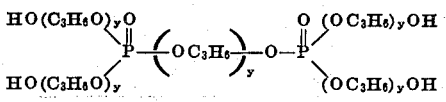
wherein $y$ has an average value of 1.6.